(12) United States Patent
Kawamoto et al.

(10) Patent No.: US 11,511,597 B2
(45) Date of Patent: Nov. 29, 2022

(54) AIR CONDITIONING REGISTER AND VEHICLE AIR CONDITIONER

(71) Applicant: Toyota Jidosha Kabushiki Kaisha, Toyota (JP)

(72) Inventors: Masashi Kawamoto, Okazaki (JP); Jun Takumi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 519 days.

(21) Appl. No.: 16/529,206

(22) Filed: Aug. 1, 2019

(65) Prior Publication Data

US 2020/0047585 A1 Feb. 13, 2020

(30) Foreign Application Priority Data

Aug. 7, 2018 (JP) .............................. JP2018-148874

(51) Int. Cl.
*B60H 1/00* (2006.01)

(52) U.S. Cl.
CPC ....... *B60H 1/00692* (2013.01); *B60H 1/0065* (2013.01)

(58) Field of Classification Search
CPC .............. B60H 1/00692; B60H 1/0065; B60H 1/3478; B60H 1/3421; B60H 1/34; B60H 1/3428; B60H 2001/3478
USPC ...................................................... 454/143
See application file for complete search history.

(56) References Cited

U.S. PATENT DOCUMENTS

| 6,146,265 | A | * | 11/2000 | Greenwald | .......... | B60H 1/3414 |
| | | | | | | 454/324 |
| 6,394,891 | B1 | * | 5/2002 | Arold | .................... | B60H 1/3414 |
| | | | | | | 454/324 |
| 2004/0005854 | A1 | * | 1/2004 | Shin | ..................... | B60H 1/3421 |
| | | | | | | 454/155 |
| 2009/0049853 | A1 | * | 2/2009 | Araki | .................... | B60H 1/0005 |
| | | | | | | 165/59 |
| 2010/0019183 | A1 | * | 1/2010 | Bosma | .................. | B60H 1/3421 |
| | | | | | | 251/248 |
| 2017/0057325 | A1 | * | 3/2017 | Brinas | .................. | B60H 1/3421 |

FOREIGN PATENT DOCUMENTS

| JP | S60106044 | U | 7/1985 |
| JP | S62130343 | U | 8/1987 |
| JP | S62179554 | U | 11/1987 |
| JP | H11059167 | A | 3/1999 |
| JP | 2003-341355 | A | 12/2003 |
| JP | 2009-286270 | A | 12/2009 |

OTHER PUBLICATIONS

Japanese Office Action dated Dec. 21, 2021 in Japanese Patent Application No. 2018-148874.

* cited by examiner

*Primary Examiner* — Steven B McAllister
*Assistant Examiner* — Charles R Brawner
(74) *Attorney, Agent, or Firm* — Dinsmore & Shohl LLP

(57) ABSTRACT

An air conditioning register has a tubular case portion that forms a blowout port and an air passage for air conditioning, and a shut-off damper that is supported at the tubular case portion so as to be movable in an intersecting direction that intersects an airflow direction of the air conditioning within the air passage, and that opens and closes the air passage by moving.

3 Claims, 6 Drawing Sheets

AIR CONDITIONING REGISTER AND VEHICLE AIR CONDITIONER

CROSS-REFERENCE TO RELATED APPLICATION

This application is based on and claims priority under 35 USC 119 from Japanese Patent Application No. 2018-148874, filed on Aug. 7, 2018, the disclosure of which is incorporated by reference herein.

BACKGROUND

Technical Field

The present disclosure relates to an air conditioning register and a vehicle air conditioner.

Related Art

Japanese Patent Application Laid-Open (JP-A) No. 11-059167 discloses an air conditioning register that is mounted to an opening for air blowout that is formed in an instrument panel in front of a front seat of an automobile, and to which an air conditioning duct is connected. This air conditioning register has an air passage for air conditioning, and a tubular case portion that forms a blowout port. A barrel portion that adjusts the direction of the air for air conditioning is provided within this tubular case portion. A plate-shaped damper (shut-off damper) that can rotate like a butterfly valve is provided within the tubular case portion at the air for air conditioning upstream side of the barrel portion. Due to the rotation of this plate-shaped damper, the air path within the tubular case portion is opened and closed, and facilitation or blocking of the passage of air, or adjustment of the amount of air that passes through, is carried out.

By the way, vehicles such as a self-driving vehicle for example require compactness of the instrument panel. In order to make the instrument panel compact, the air conditioning register that is mounted to the instrument panel may be made compact in the air passage direction of the air for air conditioning. The dimension in the air passage direction of the air conditioning register is determined in accordance with the internal mechanisms such as the barrel portion and the shut-off damper and the like, and the dimension in the air passage direction cannot be set to be shorter than the internal mechanisms. With regard to this point, the aforementioned related art is a structure in which the shut-off damper is rotated like a butterfly valve. Therefore, space for the rotation of the shut-off damper is configured at the interior of the tubular case portion, and there are limits on making the air conditioning register compact as described above.

SUMMARY

In view of the above-described circumstances, an object of the present disclosure is to provide an air conditioning register that can be made compact in the air passage direction for air conditioning, and a vehicle air conditioner that is provided with the air conditioning register.

An air conditioning register of a first aspect of the present disclosure has a tubular case portion that forms a blowout port and an air passage for air conditioning, and a shut-off damper that is supported at the tubular case portion so as to be movable in an intersecting direction that intersects an airflow direction of the air conditioning within the air passage, and that opens and closes the air passage by moving.

In accordance with the first aspect, the shut-off damper is supported at the tubular case portion that forms the blowout port and the air passage for air conditioning. The shut-off damper can move in an intersecting direction that intersects the airflow direction of the air conditioning within the air passage. Due thereto, there is no need to ensure space for rotation of the shut-off damper within the tubular case portion, and therefore, the present air conditioning register can be made to be compact in the air passage direction.

An air conditioning register of a second aspect of the present disclosure has a tubular case portion that forms a blowout port and an air passage for air conditioning, and to which an air conditioning duct is connected at an opposite side of the tubular case portion from the blowout port, and a shut-off damper that is supported at the tubular case portion so as to be rotatable between an open position, at which the shut-off damper extends toward the opposite side from the blowout port so as to be superposed on an inner surface of the air conditioning duct and opens the air passage, and a closed position at which the shut-off damper closes the air passage.

In accordance with second aspect, the air conditioning duct is connected to the side opposite the blowout port, of the tubular case portion that forms the blowout port and the air passage for air conditioning. The shut-off damper that opens and closes the air passage is rotatably supported at the tubular case portion. At the open position at which the shut-off damper opens the air passage, the shut-off damper extends toward the opposite side from the blowout port so as to be superposed with an inner surface of the air conditioning duct. Due thereto, the majority of the space for rotation of the shut-off damper can be set within the air conditioning duct (i.e., outside of the tubular case portion), and therefore, the space for rotation of the shut-off damper within the tubular case portion can be reduced. As a result, the present air conditioning register can be made to be compact in the air passage direction of the air conditioning within the tubular case portion.

In an air conditioning register of a third aspect of the present disclosure, in the first aspect, the shut-off damper can slide in the intersecting direction.

In accordance with the third aspect, because the shut-off damper is slidably supported at the tubular case portion, the shut-off damper and the supporting structure thereof can be made to be simple structures.

An air conditioning register of a fourth aspect of the present disclosure has, in the third aspect, an operating portion that is rotatably supported at the tubular case portion, that contacts the shut-off damper, and that, by being rotationally operated, slides the shut-off damper in the intersecting direction.

In accordance with the fourth aspect, the operating portion, which is rotatably supported at the tubular case portion, contacts the shut-off damper. The shut-off damper is slid due to the operating portion being rotationally operated. Because the shut-off damper is slid by the rotary operating portion, the shut-off damper can be slid smoothly by a simple structure.

In an air conditioning register of a fifth aspect of the present disclosure, in the first aspect, the shut-off damper has a bellows portion that can extend and contract in a manner of bellows, and the shut-off damper is moved in the intersecting direction by expansion and contraction of the bellows portion.

In accordance with the fifth aspect, the shut-off damper is moved in the intersecting direction (a direction intersecting the air passage direction for air conditioning), due to the bellows portion of the shut-off damper extending and contracting in the form of bellows. Namely, the shut-off damper closes the air passage due to the bellows portion extending in the intersecting direction, and the shut-off damper opens the air passage due to the bellows portion contracting in the intersecting direction. Due thereto, the space for placement of the shut-off damper that is in the state of opening the air passage can be set to be small. Therefore, the present air conditioning register becoming large in the intersecting direction (i.e., the direction of movement of the shut-off damper) can be prevented or suppressed.

An air conditioning register of a sixth aspect of the present disclosure has, in the second aspect, an operating portion that is rotatably supported at the tubular case portion, and a link portion that spans from the operating portion to the shut-off damper, wherein the shut-off damper opens and closes the air passage as a result of rotational operation of the operating portion.

In accordance with the sixth aspect, the shut-off damper that can rotate between the above-described open position and closed position, or the shut-off damper that can extend and contract in the manner of bellows, is provided within the tubular case portion. Further, the link portion spans from the operating portion, which is rotatably supported at the tubular case portion, to either of the above-described shut-off dampers. The shut-off damper opens and closes the air passage as a result of the operating portion being rotationally operated. Because the shut-off damper is operated by the rotary operating portion and the link portion in this way, the structure for operating the shut-off damper can be simplified.

A vehicle air conditioner of a seventh aspect of the present disclosure has an air conditioner main body that is provided within an instrument panel of a vehicle, an air conditioning duct that extends outward from the air conditioner main body, and the air conditioning register of the first aspect, wherein which the tubular case portion, which is connected to the air conditioning duct, is mounted at the instrument panel.

In accordance with the seventh aspect, the air conditioning duct extends outward from the air conditioner main body that is provided within the instrument panel of the vehicle. The tubular case portion of the air conditioning register, which is connected to the air conditioning duct, is mounted at the instrument panel. Because the air conditioning register is that of the first aspect, the above-described operation and effects are achieved. Further, due to the air conditioning register being made to be compact in the air passage direction for air conditioning, the instrument panel can be made to be compact.

As described above, the air conditioning register and the vehicle air conditioner that has the air conditioning register, which relate to the present disclosure, can be made to be compact in the air passage direction for air conditioning.

BRIEF DESCRIPTION OF THE DRAWINGS

Exemplary embodiments of the present disclosure will be described in detail based on the following figures, wherein.

DETAILED DESCRIPTION

First Embodiment

Figure 1:
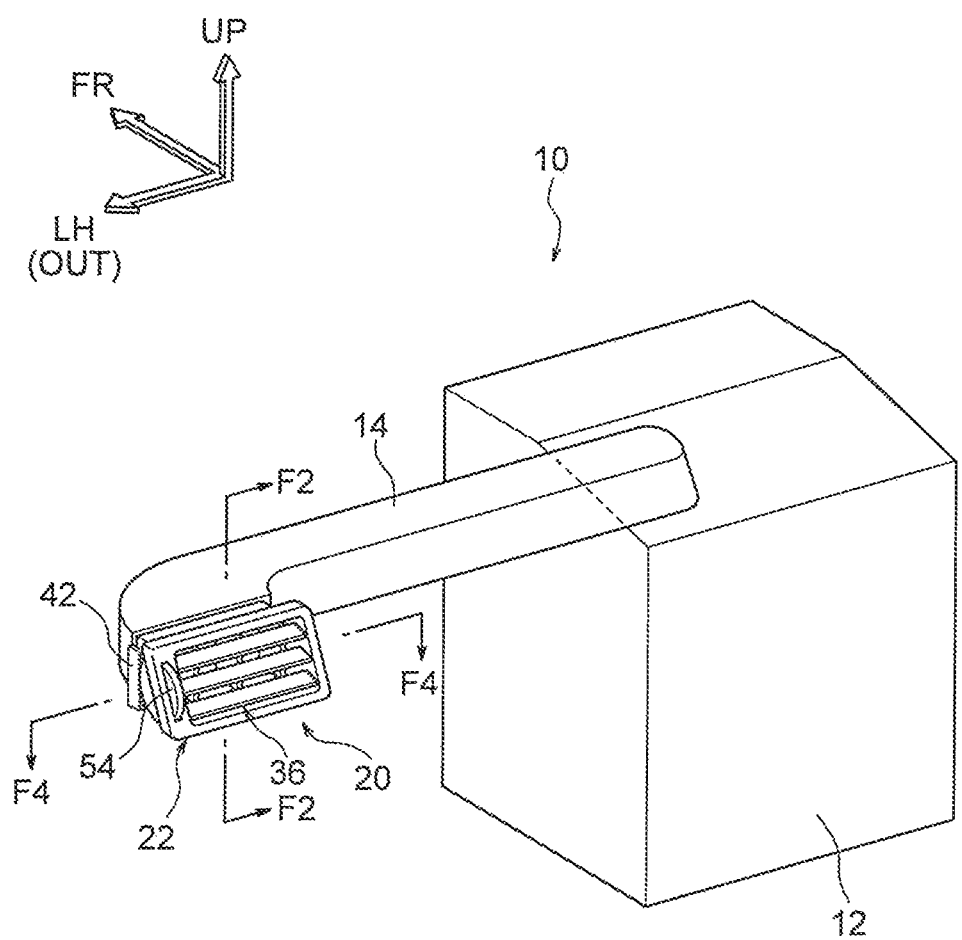
FIG. 1 is a perspective view that shows a partial structure of a vehicle air conditioner relating to a first embodiment of the present disclosure.

A vehicle air conditioner 10 relating to a first embodiment of the present disclosure is described hereinafter by using FIG. 1 through FIG. 4. Note that arrow FR, arrow UP and arrow LH (OUT) that are shown appropriately in the respective drawings indicate die forward side (advancing direction), the upward side and the leftward side (vehicle transverse direction outer side) of the vehicle, respectively. Hereinafter, when explanation is given by using merely longitudinal, left-right and vertical directions, they refer to the longitudinal of the vehicle longitudinal direction, the left and right of the vehicle left-right direction (vehicle transverse direction) and the vertical of the vehicle vertical direction, unless otherwise indicated. Further, there are cases in which some of the reference numerals are omitted from the respective drawings in order to make the drawings easier to understand.

(Structure)

As shown in FIG. 1, the vehicle air conditioner 10 relating to the present embodiment has an HVAC (Heating, Ventilation, and Air Conditioning) unit 12 that serves as an air conditioner main body, front face ducts 14 that serve as air conditioning ducts and extend out from the HVAC unit 12, and side registers 20 that serve as air conditioning registers and are connected to the distal end portions of the front face ducts 14. The HVAC unit 12 is disposed at the inner side of an instrument panel 16 (shown only in FIG. 2) of the vehicle, i.e., between the instrument panel 16 and an unillustrated dash panel.

The HVAC unit 12 has a fan, an evaporator, a heater core and the like, and adjusts the temperature, the humidity and the like of the airflow that is generated by the rotation of the fan, and introduces the airflow into the front face ducts 14 as air for air conditioning. Note that a pair of the left and right front face ducts 14 (the front face duct 14 at the right side is not illustrated), and an unillustrated central duct, pair of left and right foot ducts, defroster ducts and the like, extend out from this HVAC unit 12. Further, the air for air conditioning is introduced into the interiors of any of the ducts among these respective ducts by the operation of an unillustrated blowout port switching switch that is provided at the instrument panel 16.

The side register 20 that is not illustrated and that serves as an air conditioning register is connected to the distal end portion of the front face duct 14 that is at the right side. The front face duct 14 at the right side and the side register 20 at the right side, and the front face duct 14 at the left side and the side register 20 at the left side, have structures that are basically similar other than the fact that they are structured so as to have left-right symmetry. Therefore, detailed description of the front face duct 14 at the right, side and the side register 20 at the right side is omitted.

Figure 2:
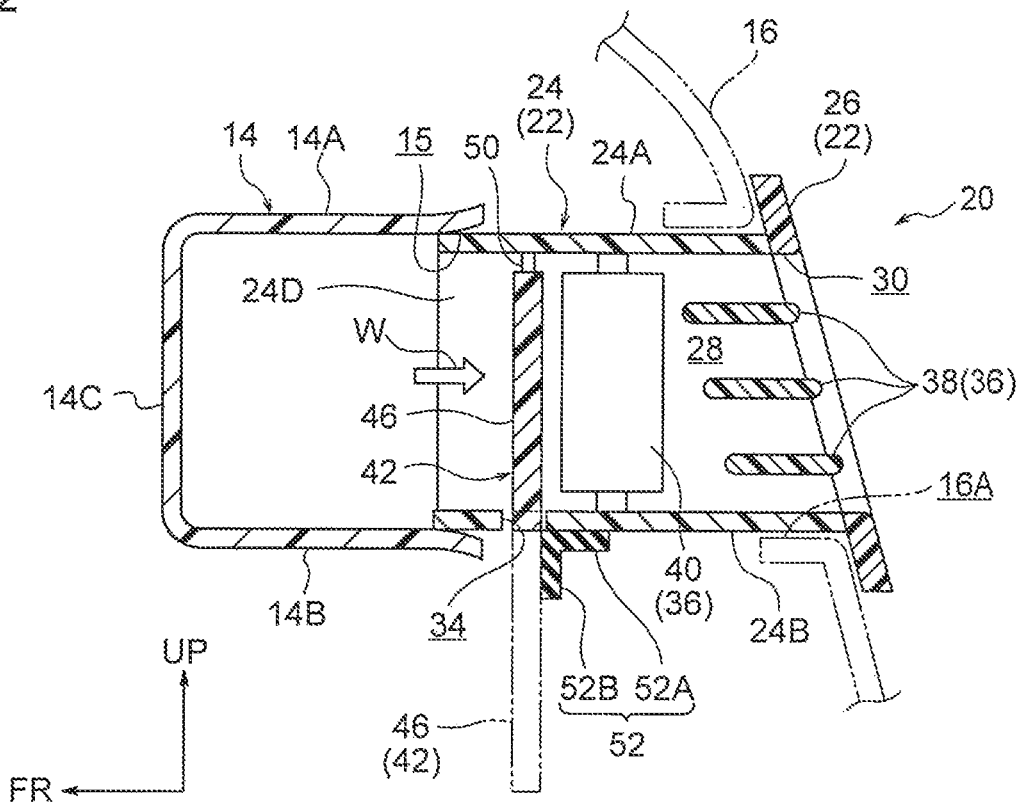
FIG. 2 is a vertical sectional view that corresponds to the cross-section along line F2-F2 of FIG. 1.
Figure 4:
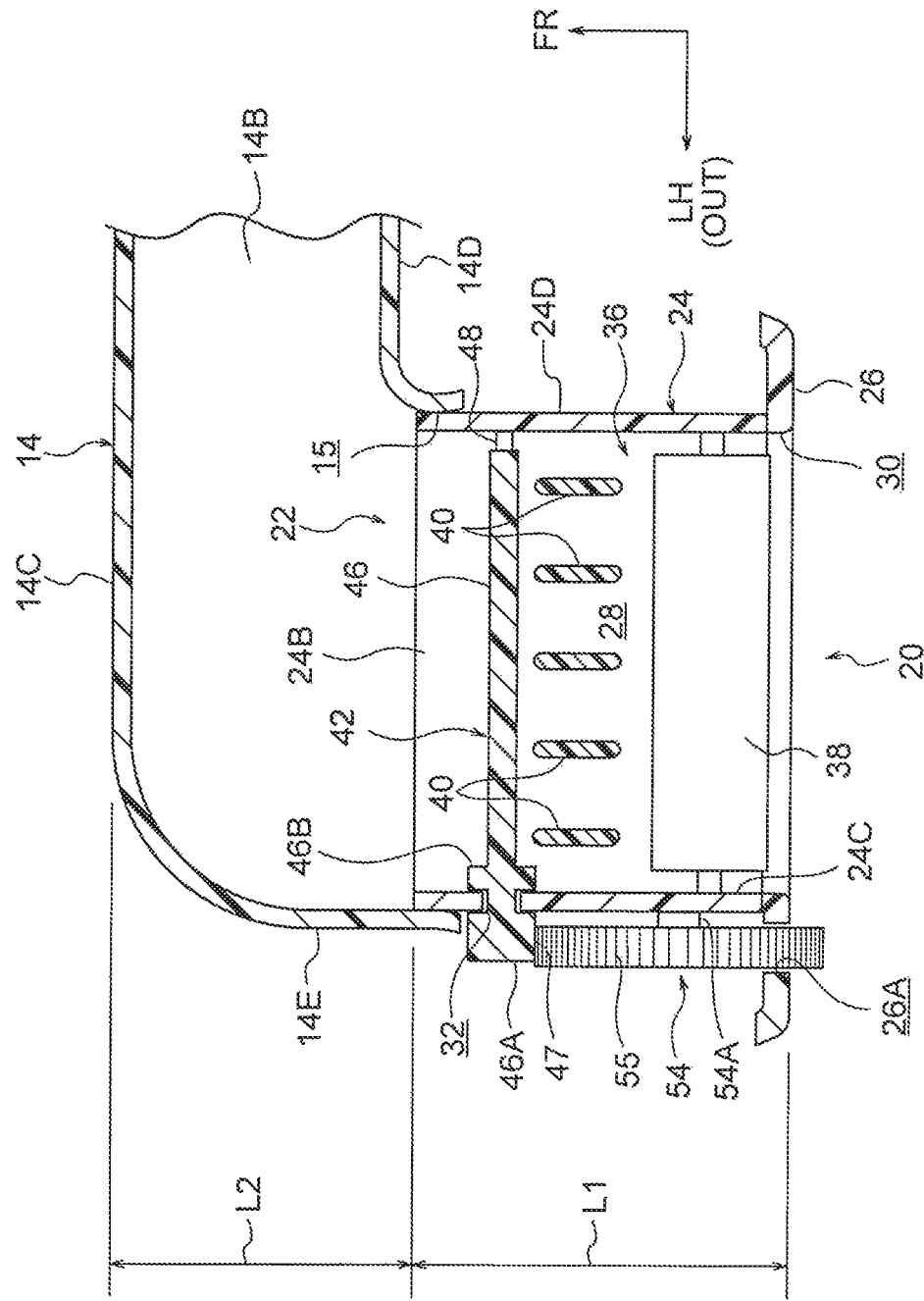
FIG. 4 is a lateral sectional view that corresponds to the cross-section along line F4-F4 of FIG. 1.

As shown in FIG. 1, FIG. 2 and FIG. 4, the front face duct 14 is formed, for example, of resin and in the shape of an elongated angular tube, and is disposed with the length thereof being in the vehicle transverse direction. This front face duct 14 extends toward the vehicle transverse direction outer side from the upper end portion of the HVAC unit 12, and is bent toward the vehicle rear side from the distal end portion (the vehicle transverse direction outer side end portion). The front face duct 14 has an upper wall 14A, a lower wall 14B, a front wall 14C, a rear wall 14D, and a left wall (vehicle transverse direction outer side wall) 14E. An opening portion 15 that opens toward the vehicle rear side is formed at the vehicle transverse direction outer side end portion of the front face duct 14. This opening portion 15 is shaped as a rectangle whose length is in the vehicle transverse direction, and the opening portion 15 corresponds to the side register 20.

As shown in FIG. 1 through FIG. 4, the side register 20 has a register case 22 that serves as a tubular case portion and forms an air passage 28 of the air for air conditioning and a face blowout port 30, a barrel portion 36 for adjusting the direction of the air for air conditioning, a shut-off damper 42 for opening and closing the air passage 28, and a dial 54 that serves as an operating portion. The face blowout port 30 corresponds to the "blowout port" of the present disclosure. Further, arrow W in FIG. 2 shows the air passage direction of the air for air conditioning within the air passage 28. This air passage direction W is the vehicle rearward direction.

The register case 22 has a retainer 24 and a retainer 26 that are formed from resin for example, and is mounted to the left end portion (the vehicle transverse direction outer side end portion) of the instrument panel 16. The retainer 24 has an upper wall 24A, a lower wall 24B, a left wall 24C and a right wall 24D, and, as seen in the vehicle longitudinal direction, is formed in the shape of an angular tube whose length is in the vehicle transverse direction. The vehicle longitudinal direction both sides of the retainer 24 are open, and form the air passage 28. The retainer 26 is formed in the shape of a rectangular frame whose length is in the vehicle transverse direction as seen from the vehicle longitudinal direction, and is disposed at the vehicle rear side of the retainer 24. The retainer 26 forms the face blowout port 30.

The retainer 24 is disposed at the left end portion of the instrument panel 16 interior, and the front end portion of the retainer 24 is fitted together with the interior of the opening portion 15 of the front face duct 14. Due thereto, the register case 22 is connected to the distal end portion of the front face duct 14. The rear end portion of the retainer 24 is inserted within an opening portion 16A for air blowout (see FIG. 2) that is formed in the left end portion of the instrument panel 16. The retainer 26 is disposed at the vehicle cabin inner side of the instrument panel 16 and is exposed to the vehicle cabin interior. The retainer 26 is joined to the retainer 24 by means (a method) such as, for example, fitting by claws, or the like.

The barrel portion 36 has plural or singular (here, plural) lateral fins 38 whose lengths are in the vehicle transverse direction, and plural or singular (here, plural) vertical fins 40 those lengths are in the vehicle vertical direction. The plural lateral fins 38 are disposed so as to be lined up substantially in the vehicle vertical direction at the rear end portion of the retainer 24 interior. The plural vertical fins 40 are disposed so as to be lined up in the vehicle transverse direction at the vehicle front side of the plural lateral fins 38, i.e., at the upstream side in the air passage direction of the air for air conditioning within the air passage 28. The plural lateral fins 38 are respectively supported at the retainer 24 so as to be able to rotate around axes that extend in the vehicle transverse direction. The plural vertical fins 40 are respectively supported at the retainer 24 so as to be able to rotate around axes that extend in the vehicle vertical direction. Further, the plural lateral fins 38 are connected to one another by an unillustrated connecting rod, and are structured so as to rotate synchronously. Similarly, the plural vertical fins 40 are connected to one another by an unillustrated connecting rod, and are structured so as to rotate synchronously.

The shut-off damper 42 is disposed at the vehicle front side (the upstream side in the air passage direction of the air for air conditioning within the air passage 28) with respect to the barrel portion 36. This shut-off damper 42 is formed in the shape of a plate from resin, for example, and has a damper main body 46 that is disposed with a plate thickness direction thereof corresponding to the vehicle longitudinal direction. Slits 32, 34 are formed in the left wall 24C and the lower wall 24B of the retainer 24, respectively, in correspondence with the damper main body 46. The slit 32 of the left wall 24C extends in the vehicle vertical direction, and the slit 34 of the lower wall 24B extends in the vehicle transverse direction. These slits 32, 34 are connected to one another.

As shown in FIG. 4, the left end portion (vehicle transverse direction outer side end portion) of the damper main body 46 is inserted through the slit 32 of the left wall 24C. A rack portion 46A and a holding portion 46B, which project out toward both sides in the vehicle longitudinal direction, are provided at the left end portion of the damper main body 46. The rack portion 46A is disposed at the vehicle transverse direction outer side of the left wall 24C, and the holding portion 26B is disposed at the vehicle transverse direction inner side of the left wall 24C. The rack portion 46A and the holding portion 46B restrict displacement of the damper main body 46 in the vehicle transverse direction with respect to the retainer 24. The damper main body 46 is also inserted through the slit 34 that is formed in the lower wall 24B, and is supported so as to be able to slide in the vehicle vertical direction with respect to the retainer 24. Namely, this damper main body 46 can slide in an intersecting direction (the vehicle vertical direction) that intersects (here, is orthogonal to) the air passage direction of the air for air conditioning within the air passage 28. The damper main body 46 can slide between a closed position that is shown by the solid line in FIG. 2 and an open position that is shown by the two-dot chain line in FIG. 2. Note that the sliding direction of the damper main body 46 is not limited to a direction that is orthogonal to the air passage direction, and may be a direction that is slightly inclined with respect to the orthogonal direction as seen in the vehicle transverse direction.

As shown in FIG. 2 and FIG. 4, sealing members 48, 50, which respectively are formed from elastic bodies of rubber or the like, are mounted to the right end portion (the vehicle transverse direction inner side end portion) and the upper end portion of the damper main body 46. The sealing member 48 that is mounted to the right end portion of the damper main body 46 is fit tightly to the right wall 24D of the retainer 24, and seals the right wall 24D together with the damper main body 46. The sealing member 50 that is mounted to the upper end portion of the damper main body 46 is fit tightly to the upper wall 24A of the retainer 24 in the state in which the damper main body 46 is positioned at the closed position, and seals the region between the upper wall 24A and the damper main body 46.

Further, as shown in FIG. 2, a sealing member 52 that is formed from an elastic body of rubber or the like is mounted to the lower surface of the lower wall 24B of the retainer 24. This sealing member 52 is structured by a fixed portion 52A that is mounted to the rear edge portion of the slit 34, and a sealing portion 52B that extends downward from the front end portion of the fixed portion 52A. The sealing member 52 is formed in an L-shape as seen in the vehicle transverse direction. The sealing portion 52B is fitted tightly to the rear surface of the damper main body 46, and seals the region between the damper main body 46 and the lower wall 24B. A method such as adhesion, fitting, or the like for example can be used as the method of mounting the above-described respective sealing members 48, 50, 52 to the damper main body 46 and the lower wall 24B.

Figure 3:
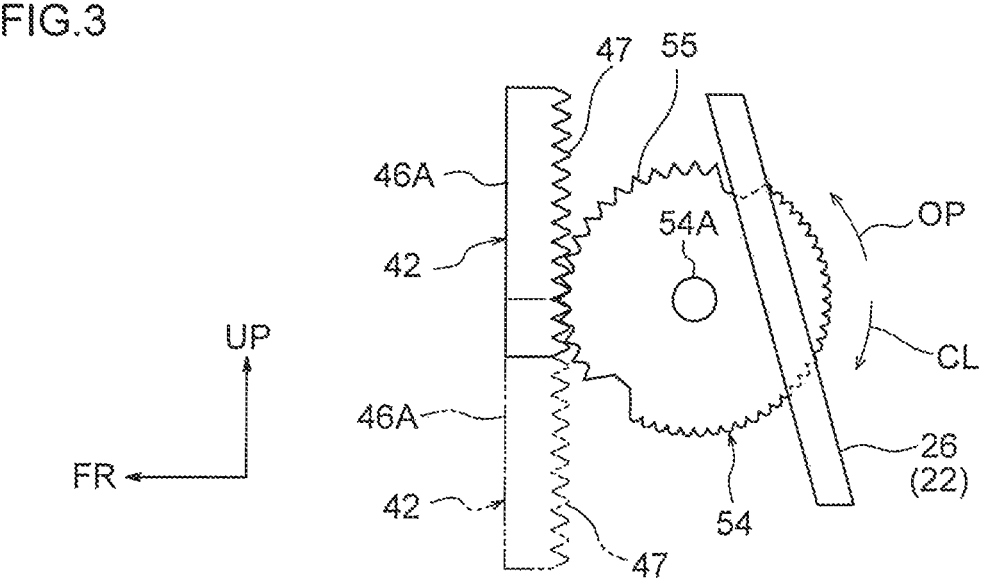
FIG. 3 is a side view of an air conditioning register relating to the first embodiment of the present disclosure.

In the state in which the shut-off damper 42 of the above-described structure is positioned at the above-described closed position, the air passage 28 is closed. In the state in which the shut-off damper 42 is positioned at the above-described open position, the air passage 28 is open. The shut-off damper 42 is slid between the closed position and the open position by the rotational operation of the dial 54 that is shown in FIG. 1, FIG. 3 and FIG. 4.

The dial 54 is formed in a disc shape of resin for example, and is disposed at the vehicle transverse direction outer side of the retainer 24 with the axial direction thereof being the vehicle transverse direction. A shaft portion 54A, which is solid cylindrical and projects out toward the retainer 24 side (the vehicle transverse direction inner side), is provided at the axially central portion of the dial 54. The shaft portion 54A is fitted together, so as to rotate freely, with a shaft receiving hole (not illustrated) that is formed in the left wall 24C of the retainer 24. Due thereto, the dial 54 is supported so as to be able to rotate with respect to the retainer 24. An opening portion 26A, which is shaped as an elongated rectangle and whose length is in the vehicle vertical direction, is formed in the left end portion of the retainer 26 in correspondence with the dial 54. The rear end side of the dial 54 is inserted through this opening portion 26A, and the rear end portion of the dial 54 is exposed to the vehicle cabin interior.

The dial 54 is disposed so as to contact, from the vehicle rear side, the rack portion 46A of the above-described damper main body 46. Gear teeth 55 that are spur teeth are formed at the vehicle front side portion of the outer peripheral portion of the dial 54. Rack teeth 47 that mesh together with the gear teeth 55 are formed at the rear edge portion of the rack portion 46A. Further, plural recesses and protrusions (no reference numeral) for preventing slippage are formed so as to be lined up in the peripheral direction of the dial 54 at the vehicle rear side portion of the outer peripheral portion of the dial 54. Due to the dial 54 being rotationally operated from the vehicle cabin inner side, the shut-off damper 42 is slid between the closed position and the open position. Concretely, when the dial 54 is rotated in arrow OP direction in FIG. 3, the shut-off damper 42 is slid to the open position. When the dial 54 is rotated in arrow CL direction of FIG. 3, the shut-off damper 42 is slid to the closed position. Further, the air passage 28 is opened and closed by the sliding of the shut-off damper 42, and switching of the passage of the air or adjustment of the amount of air that passes through is carried out.

(Operation and Effects)

Operation and effects of the present embodiment are described next.

In the vehicle air conditioner 10 relating to the present embodiment, the front face ducts 14 extend out from the HVAC unit 12 that is provided within the instrument panel 16 of the vehicle. The register case 22 of the side register 20 is mounted to the front face duct 14. The register case 22 forms the air passage 28 of the air for air conditioning and the face blowout port 30, and supports the shut-off damper 42. The shut-off damper 42 is movable in an intersecting direction (here, the vehicle vertical direction) that intersects the air passage direction (here, the vehicle rearward direction) of the air for air conditioning within the air passage 28. Due thereto, there is no need to ensure space for rotation of the shut-off damper 42 within the register case 22, and therefore, the present side register 20 can be made to be compact in the aforementioned air passage direction (L1 in FIG. 4 can be shortened).

Further, by making the side register 20 compact in the vehicle longitudinal direction as described above, the front face duct 14 can be bent near to the face blowout port 30. As a result, the structure at the vehicle transverse direction outer side end portion of the vehicle air conditioner 10, including the front face duct 14, can conserve on space in the vehicle longitudinal direction (L1+L2 in FIG. 4 can be shortened). Therefore, it is easy to make the instrument panel 16 compact (thin) in the vehicle longitudinal direction, and enlargement of the vehicle cabin interior is possible.

Moreover, because the shut-off damper 42 is supported so as to be able to slide in the aforementioned intersecting direction with respect to the register case 22, the shut-off damper 42 and the supporting structure thereof can be made to be simple structures. Namely, it suffices to make the shut-off damper 42, which is formed in a plate-shape overall, fitted together slidably with the slit 32 of the register case 22, and therefore, the structure is simple, and the number of parts and the number of assembly processes are few.

In the present embodiment, the dial 54 that is rotatably supported at the register case 22 contacts the shut-off damper 42. The shut-off damper 42 is slid due to the dial 54 being rotationally operated. Because the shut-off damper 42 is slid by the rotary dial 54 (operating portion) in this way, the shut-off damper 42 can be slid smoothly by a simple structure.

Namely, for example, it is possible to utilize a structure in which a link and the like bridge between the shut-off damper 42 and an operation lever that is rotatably supported at the register case 22, and the shut-off damper 42 slides due to the rotational operation of the operation lever. However, this structure is complex. Further, because the rotational motion of the operation lever may be converted into rectilinear motion of the shut-off damper 42 by the aforementioned link and the like, adjustment for causing the shut-off damper 42 to slide smoothly is complex. With regard to this point, in the present embodiment, by making the gear teeth 55, which are formed at the outer peripheral portion of the dial 54, and the rack teeth 47, which are formed at the rack portion 46A of the shut-off damper 42, mesh together, the rotational motion of the dial 54 is converted into rectilinear motion of the shut-off damper 42, and therefore, the shut-off damper 42 can be slid smoothly.

Note that, although the above-described first embodiment is structured such that the dial 54 directly contacts the shut-off damper 42, the present disclosure is not limited to this, and may be structured such that other members (e.g., links, gears, or the like) are interposed between the dial 54 and the shut-off damper 42.

Further, although the above-described first embodiment is structured such that the dial 54 is made to be the operating portion, the present disclosure is not limited to this and may be structured such that an operation lever such as described above is made to be the operating portion.

Other embodiments of the present disclosure are described next. Note that structures and operations that are basically similar to those of the above-described first embodiment are denoted by the same reference numerals as in the first embodiment, and description thereof is omitted.

Second Embodiment

Figure 5:
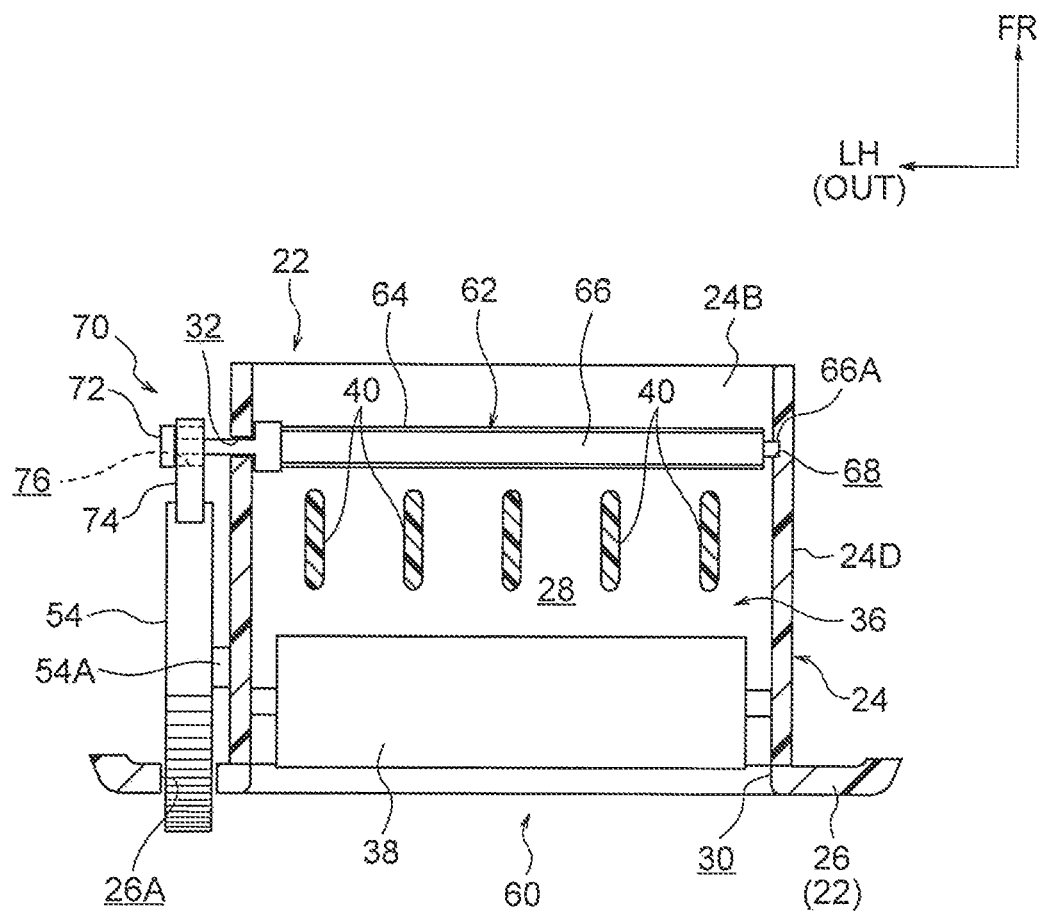
FIG. 5 is a lateral sectional view of an air conditioning register relating to a second embodiment of the present disclosure.

A side register 60, which serves as an air conditioning register relating to a second embodiment of the present disclosure, is shown in a lateral sectional view in FIG. 5. A partial structure of the side register 60 is shown in side views in FIG. 6 and FIG. 7. The side register 60 is structured similarly to the side register 20 relating to the first embodiment, but has a shut-off damper 62 that is different than the shut-off damper 42 relating to the first embodiment. Further, at this side register 60, a link portion 70 spans from the dial 54, which does not have the gear teeth 55, to the shut-off damper 62.

The shut-off damper 62 is disposed at a position, which is similar to that of the shut-off damper 42 relating to the first embodiment, within the air passage 28 of the register case 22. This shut-off damper 62 has a bellows portion 64 that is formed in the shape of bellows. The bellows portion 64 is, for example, formed substantially in the shape of a wavy plate of a soft resin, and is disposed in a posture in which the plural folds that extend in the vehicle transverse direction are lined up in the vehicle vertical direction. This bellows portion 64 can extend and contract in the form of bellows in the vehicle vertical direction. The lower end portion of the bellows portion 64 is fixed to the upper surface of the lower wall 24B of the retainer 24 (not shown in FIG. 6 and FIG. 7). Note that the present embodiment is structured such that the slit 34 relating to the first embodiment is not formed in the lower wall 24B of the retainer 24.

A sliding portion 66, which is formed in the shape of an angular rod of resin or metal, is fixed to the upper end portion of the bellows portion 64. The sliding portion 66 is disposed such that the length thereof is in the vehicle transverse direction. The sliding portion 66, together with the bellows portion 64, structures the shut-off damper 62. A groove fitting portion 66A, which fits together with the interior of a vertical groove 68 that is formed in the right wall 24D of the retainer 24, is formed at one end portion (the vehicle transverse direction inner side end portion) of the sliding portion 66. The vertical groove 68 extends in the vehicle vertical direction. The one end portion of the sliding portion 66 is supported so as to be able to slide up and down with respect to the right wall 24D.

A link connecting portion 72, which is formed of resin or metal and in the shape of a solid cylinder that is stepped, is fixed to the another end portion (the vehicle transverse direction outer side end portion) of the sliding portion 66. This link connecting portion 72 is disposed such that the axial direction thereof is the vehicle transverse direction, and the axial direction intermediate portion thereof is formed to have a smaller diameter than the axial direction both end portions. The axial direction intermediate portion (small diameter portion) of the link connecting portion 72 is inserted through the slit 32 that is formed in the left wall 24C of the retainer 24. Due thereto, the another end portion of the sliding portion 66 is supported via the link connecting portion 72 so as to be able to slide up and down with respect to the left wall 24C.

The above-described dial 54 is disposed at the vehicle transverse direction outer side of the left wall 24C of the retainer 24. The dial 54 has a link piece 74 that extends toward the vehicle front side. A long hole 76, which passes through the link piece 74 in the vehicle transverse direction, is formed in the front end portion of the link piece 74. This long hole 76 is formed such that the length thereof runs along the length direction of the link piece 74. The axial direction intermediate portion (small diameter portion) of the link connecting portion 72 is inserted through this long hole 76. Due thereto, the link piece 74 of the dial 54 and the sliding portion 66 of the shut-off damper 62 are connected via the link connecting portion 72. The link connecting portion 72 and the link piece 74 structure the aforementioned link portion 70.

Figure 6:
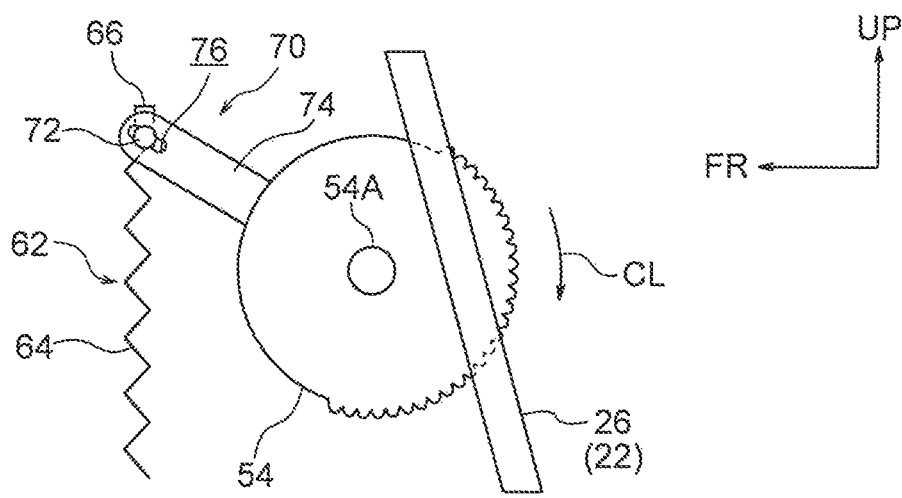
FIG. 6 is a side view that shows a partial structure of the air conditioning register relating to the second embodiment, and is a drawing showing a state in which a shut-off damper closes an air passage.
Figure 7:
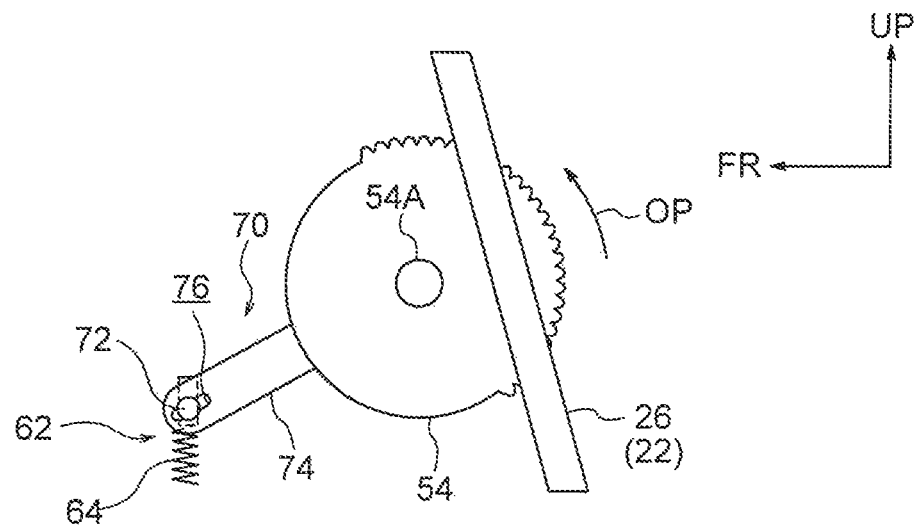
FIG. 7 is a side view that corresponds to FIG. 6 and shows a state in which the shut-off damper opens the air passage.

In the side register 60 of the above-described structure, when the dial 54 is rotated in the arrow CL direction in FIG. 6, the sliding portion 66 of the shut-off damper 62 is moved upward, and the bellows portion 64 of the shut-off damper 62 is extended. Due thereto, the air passage 28 is closed. Further, when the dial 54 is rotated in the arrow OP direction in FIG. 7, the sliding portion 66 of the shut-off damper 62 is moved downward, and the bellows portion 64 of the shut-off damper 62 is contracted. Due thereto, the air passage 28 is opened. Namely, this embodiment is structured such that the shut-off damper 62 is moved in the vehicle vertical direction (i.e., the intersecting direction that intersects the air passage direction of the air for air conditioning within the air passage 28), by the extension and contraction of the bellows portion 64. In the present embodiment, structures other than those described above are similar to those of the first embodiment.

In the present embodiment as well, the shut-off damper 62 is supported at the register case 22 so as to be movable in the intersecting direction (the vehicle vertical direction) that intersects the air passage direction (the vehicle rearward direction) of the air for air conditioning within the air passage 28. Due thereto, there is no need to ensure space for rotation of the shut-off damper 62 within the register case 22, and therefore, the present side register 60 can be made to be compact in the aforementioned air passage direction.

Moreover, in the present embodiment, the shut-off damper 62 is moved in the aforementioned intersecting direction due to the bellows portion 64 of the shut-off damper 62 extending and contracting in the form of bellows. Namely, at the shut-off damper 62, the air passage 28 is closed due to the bellows portion 64 extending in the aforementioned intersecting direction, and the air passage 28 is opened due to the bellows portion 64 contracting in the aforementioned intersecting direction. Due thereto, the space for placement of the shut-off damper 62 that is in the state of opening the air passage 28 can be set to be small. Therefore, the present side register 60 becoming large in the aforementioned intersecting direction (i.e., the moving direction of the shut-off damper 62) can be prevented or suppressed.

Further, in the present embodiment, the link portion 70 spans from the dial 54, which is rotatably supported at the register case 22, to the above-described shut-off damper 62. The shut-off damper 62 opens and closes the air passage due to the dial 54 being rotationally operated. Because the shut-off damper 62 is operated by the rotary dial 54 and the link portion 70 in this way, the structure for operating the shut-off damper 62 can be simplified.

Third Embodiment

Figure 8:
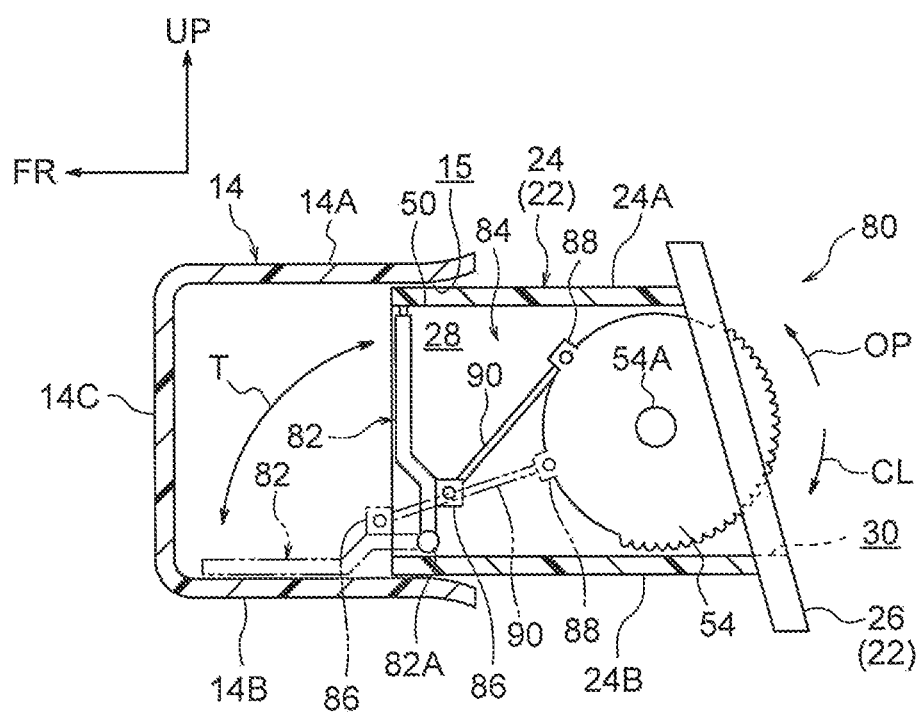
FIG. 8 is a vertical sectional view of an air conditioning register relating to a third embodiment of the present disclosure.

A side register 80, which serves as an air conditioning register relating to a third embodiment of the present disclosure, is shown in FIG. 8 in a vertical sectional view. The side register 80 is structured similarly to the side register 20 relating to the first embodiment, but has a shut-off damper 82 that is different than the shut-off damper 42 relating to the first embodiment. Further, at this side register 80, a link portion 84 spans from the dial 54, which does not have the gear teeth 55, to the shut-off damper 82. Note that illustration of the barrel portion 36 is omitted from FIG. 8.

The shut-off damper 82 is supported at the register case 22 so as to be able to rotate between an open position, at which the shut-off damper 82 extends toward the side opposite the face blowout port 30 (the vehicle front side) so as to be superposed on an inner surface of the front face duct 14 (here, the upper surface of the lower wall 14B) and opens the air passage 28 (refer to the shut-off damper 82 that is shown by the two-dot chain line in FIG. 8), and a closed position of closing the air passage 28 (refer to the shut-off damper 82 shown by the solid line in FIG. 8). Specifically, the shut-off damper 82 is formed in the shape of an elongated plate of resin for example, and is disposed at the front end side of the air passage 28 in a posture in which the length thereof is in the vehicle transverse direction. A shaft portion 82A is provided at one of the long side edge portions of the shut-off damper 82. The shaft portion 82A is disposed with the axial direction thereof being the vehicle transverse direction, and the axial direction both end portions thereof are rotatably supported at the respective lower end portions of the left wall 24C and the right wall 24D of the retainer 24. Due thereto, the shut-off damper 82 is supported at the retainer 24 (i.e., the register case 22) so as to be able to rotate between the above-described open position and the above-described closed position.

A bent portion (not given a reference numeral), which is bent substantially in the shape of a crank as seen in the vehicle transverse direction, is formed at the shaft portion 82A side region of the shut-off damper 82. Due thereto, in the state in which the shut-off damper 82 is positioned at the open position, the region, which is at the side opposite the shaft portion 82A, of the shut-off damper 82 is disposed substantially in the same plane as the lower wall 24B of the retainer 24.

A link connecting portion 86 is provided at the region, which is further toward the shaft portion 82A side than the aforementioned bent portion, of the shut-off damper 82. This link connecting portion 86 is a structural element of the link portion 84. The link portion 84 includes a link connecting portion 88 that is provided at the front edge portion of the dial 54, and a link member 90 that bridges between the respective link connecting portions 86, 88. The link member 90 is formed in the shape of an elongated rod, and the length direction both end portions thereof are connected to the respective link connecting portions 86, 88, so as to be able to rotate around axes that run along the vehicle transverse direction.

At the shut-off damper 82 of the above-described structure, when the dial 54 is rotated in the arrow CL direction in FIG. 8, the shut-off damper 82 is rotated to the closed position. When the dial 54 is rotated in the arrow OP direction in FIG. 8, the shut-off damper 82 is rotated to the open position. In the state in which the shut-off damper 82 is positioned at the closed position, the shut-off damper 82 is disposed at the front end portion of the air passage 28 interior, and the air passage interior 28 is closed. In the state in which the shut-off damper 82 is positioned at the open position, the shut-off damper 82 is adjacent to and faces the upper surface of the lower wall 14B of the front face duct 14, and the air passage 28 is open. Note that the shut-off damper 82 that is positioned at the open position may be structured so as to contact the upper surface of the lower wall 14B. In this embodiment, structures other than those described above are similar to the first embodiment.

In the present embodiment, when the shut-off damper 82 is at the open position of opening the air passage 28, the shut-off damper 82 extends toward the side opposite the face blowout port 30 so as to be superposed on an inner surface of the front face duct 14 (the upper surface of the lower wall 14B). Due thereto, the majority of the space for rotation of the shut-off damper 82 can be set to be within the front face duct 14 (i.e., outside of the register case 22), and therefore, the space for rotation of the shut-off damper 82 within the register case 22 can be reduced. As a result, the present side register 80 can be made to be compact in the air passage direction of the air for air conditioning within the register case 22. Moreover, in the present embodiment, because the shut-off damper 82 falls down along the upper surface of the lower wall 14B of the front face duct 14, obstruction of the passage of the air for air conditioning by the shut-off damper 82 can be suppressed.

Further, in the present embodiment, the link portion 84 spans from the shut-off damper 82 to the dial 54 that is rotatably supported at the register case 22. The shut-off damper 82 opens and closes the air passage 28 due to the dial 54 being rotationally operated. Because the shut-off damper 82 is operated by the rotary dial 54 and the link portion 84 in this way, the structure for operating the shut-off damper 82 can be simplified.

<Supplementary Description of Embodiments>

The above-described third embodiment is structured such that the shut-off damper 82 that is positioned at the open position extends toward the side opposite the face blowout port 30 (the vehicle front side) so as to be superposed on the upper surface of the lower wall 14B of the front face duct 14. However, the present disclosure is not limited to this. Namely, the shut-off damper 82 that is positioned at the open position may be structured so as to extend toward the vehicle front side so as to be superposed with the lower surface of the upper wall 14A of the front face duct 14.

Further, although the above-described third embodiment is structured such that the dial 54 is made to be the operating portion, the present disclosure is not limited to this, and may be structured such that a link and the like bridge between the shut-off damper 82 and an operation lever that is rotatably supported at the register case 22, and the shut-off damper 82 rotates due to the rotational operation of this operation lever. This point holds for the above-described second embodiment as well.

The above-described respective embodiments are structured such that the side registers 20, 60, 80, which are provided at a vehicle transverse direction end portion of the instrument panel 16 and to which the front face duct 14 is connected, are made to be the air conditioning register relating to the present disclosure. However, the present disclosure is not limited to this, and may be structured such that a central register, which is provided at the vehicle transverse direction central portion of the instrument panel and to which a central duct is connected, is made to be the air conditioning register relating to the present disclosure.

In addition, the present disclosure can be implemented by being changed in various ways within a scope that does not depart from the gist thereof. Further, the scope of the right of the present disclosure is, of course, not to be limited to the above-described respective embodiments.

What is claimed is:

1. An air conditioning register, comprising:
a tubular case portion that forms a blowout port and an air passage for air conditioning, the blowout port defining an opening in the tubular case portion such that when air is blown through the air passage the air exits the tubular case portion through the blowout port;
a shut-off damper that is supported at the tubular case portion so as to be movable in an intersecting direction that intersects an airflow direction of the air conditioning within the air passage, and that opens and closes the air passage by moving, wherein the shut-off damper is positioned aft of the blowout port and a barrel portion; and
an operating portion rotatably supported at the tubular case portion, the operating portion comprising a dial that is formed in a disc shape with gear teeth formed on a first portion of an outer peripheral portion of the dial, the gear teeth meshed with rack teeth formed on the shut-off damper, a second portion of the outer peripheral portion of the dial extending beyond the blowout port thereby being rotationally operable such that rotational operation of the dial slides the shut-off damper in the intersecting direction.

2. A vehicle air conditioner, comprising:
an air conditioner main body that is provided within an instrument panel of a vehicle;
an air conditioning duct that extends outward from the air conditioner main body; and
the air conditioning register of claim 1, wherein which the tubular case portion, which is connected to the air conditioning duct, is mounted at the instrument panel.

3. The vehicle air conditioner of claim 2, wherein:
the air conditioning duct is a front face duct that extends from the air conditioner main body toward a vehicle transverse direction outer side, and
the air conditioning register is a side register that is connected to a distal end portion of the front face duct.

* * * * *